April 9, 1968
H. JOYCE, JR
3,376,755
MECHANICAL MOVEMENT
Filed Aug. 24, 1966
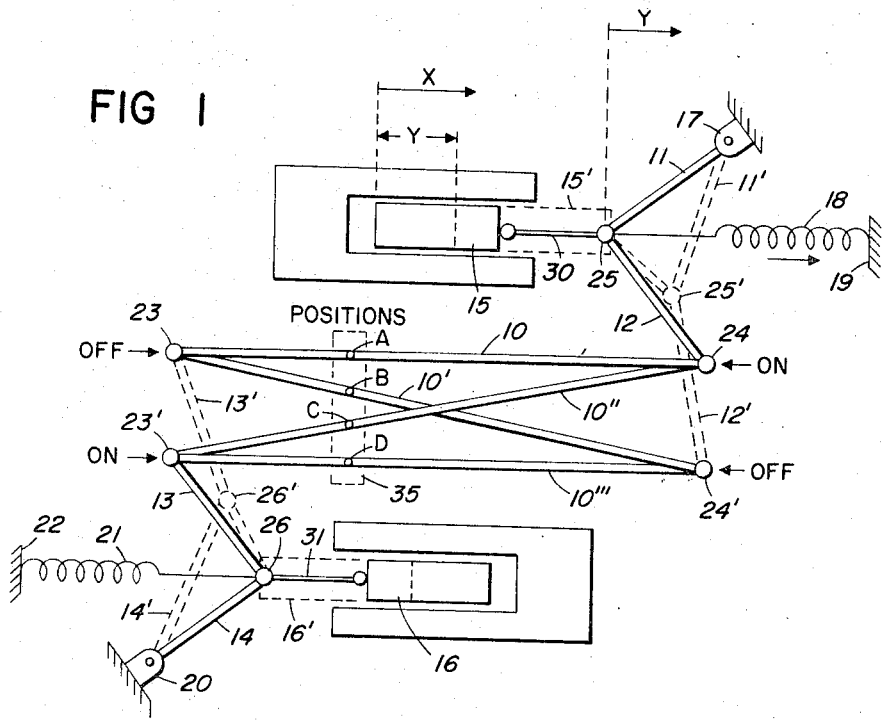
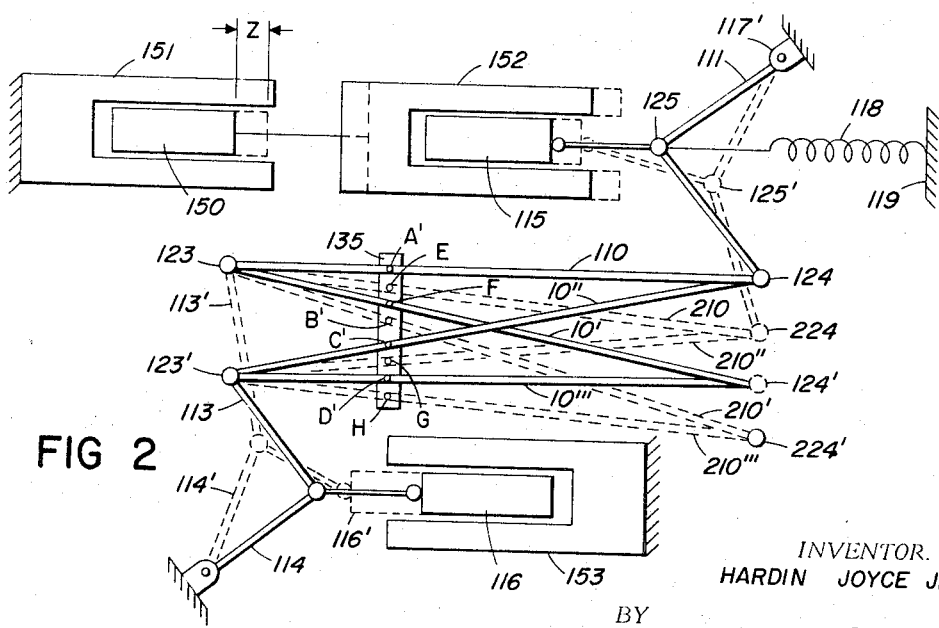
INVENTOR.
HARDIN JOYCE JR.
BY
Moody and Phillips
ATTORNEYS United States Patent Office 3,376,755
Patented Apr. 9, 1968

3,376,755
MECHANICAL MOVEMENT
Hardin Joyce, Jr., Marion, Iowa, assignor to Collins Radio Company, Cedar Rapids, Iowa, a corporation of Iowa
Filed Aug. 24, 1966, Ser. No. 574,825
6 Claims. (Cl. 74—110)

This invention relates generally to mechanical movements having discrete positions and actuated by driving means, such as solenoids, and more specifically to a mechanical movement wherein the number of discrete positions is equal to $2^n$, where $n$ is the number of driving means.

There are many applications requiring a mechanical movement which moves in discrete steps in response to some input signal. Many of these applications are for control purposes. As an example of one application, it has been found desirable in the computer art to employ small tape recorders as supplemental storage devices to larger storage means, such as larger tape stands. The smaller tape recording units require mechanical force to shift from one type operation to another, as for example, from forward run to rewind or to load and unload, i.e., to write and read. The command signals (instructions) which call for the different modes of operation of the small tape recorders ordinarily originate somewhere in the main computer or sometimes at some other point in the data processing system. In any event, the control supplied to the small tape unit is usually in the form of a binary code and must be translated into mechanical motion in order to effect the control.

The present invention will perform such a translation of command signals into mechanical motion to operate a small tape recorder. It is to be understood, however, that this is but one of many uses that could be employed for the mechanical movement described herein.

There are many mechanical movements which will provide a plurality of discrete positions in response to input signals supplied thereto. However, such prior art mechanical movements are relatively complex compared to the present invention and usually provide one discrete position for each actuating or driving means therefor. In other words, if the mechanical movement has ten discrete positions, then ten actuating means are required in order to effect the ten discrete positions of the movement.

It is a primary object of the present invention to provide a mechanical movement having $2^n$ discrete positions where $n$ is the number of driving means.

A second aim of the invention is a mechanical movement having a large number of discrete positions with a relatively small number of driving means.

A third purpose of the invention is a mechanical movement having a point thereon which can assume any given one of $2^n$ discrete positions, all lying along a predetermined path such as a straight line, and having $n$ driving means.

A fourth object of the invention is the improvement of mechanical movements generally.

In accordance with one form of the invention, there are provided five linkage elements which are connected end-to-end in a serial manner between two fixed pivotal points. First, second, third, and fourth pivotal connecting means, respectively, connect the first linkage element to the second linkage element, the second linkage element to the third linkage element, the third linkage element to the fourth linkage element, and the fourth linkage element to the fifth linkage element. First and second driving means, which can be solenoids, are connected through sixth and seventh linkage means to the first and fourth pivotal connecting means, respectively, to drive the mechanical movement. Movement is restricted to a single plane.

In order to control the direction of motion of the mechanical movement, a pin is mounted on the center or third linkage at the point off the center thereof. The said pin is caused to ride in a slot formed in a fixed plate with the shape of the slot being of any desired configuration, such as straight, for example. As the driving means are energized or de-energized in their various combinations the pin will assume selective ones of $2^n$ discrete positions in said slot, where $n$ is the number of driving means.

The above-mentioned and other objects and features of the invention will be more fully understood from the following detailed description thereof when read in conjunction with the drawings in which:

FIG. 1 shows a plan view of the invention employing two driving means and with the mechanical movement having $2^n$ discrete positions where $n$ is equal to 2; and FIG. 2 is another plan view of the invention employing three driving means and with the mechanical movement having $2^3$ or eight discrete positions.

Referring now to FIG. 1, the bar (or rod) is shown in four different positions represented by reference characters 10, 10', 10'', and 10'''. The two ends of rod 10, designated by reference characters 23 and 24, are each positioned in one of two positions under control of solenoids 15 and 16, respectively. For example, the right-hand end 24 of bar 10 is controlled by solenoid 15, and is linked thereto through linkages 30 and 12, which linkages are connected together at floating pivot point 25. Pivot point 25 is also secured to a fixed pivot connection 17 through linkage 11.

In the position of solenoid 15, as shown in solid lines, the end 24 of bar 10 is in the upper position as opposed to the lower position indicated by the reference character 24'. When solenoid 15 is de-energized it will move to the dotted line position 15' under the influence of tension spring 18, thus forcing the end 24 of bar 10 down into the position indicated by reference character 24'.

In a similar manner the solenoid 16 will cause the end 23 of bar 10 to move into one of two positions. More specifically, when solenoid 16 to energized into the position shown in solid lines, the position of end 23' of bar 10 will be determined by the movement and consequent position of linkages 31, 13, and 14. When solenoid 16 is de-energized it will be pulled to the left by tension spring 21 to assume the position shown in dotted line form 16'. In such position the left-hand end of bar 10 will assume the position indicated by reference character 23.

The four positions of a selected point on bar 10 are indicated by the letters A, B, C, and D. Such positions A, B, C, and D are obtained by pin 85 secured to bar 10. The pin 85 can slide up and down in the slot 35 provided therefor, in response to movement of bar 10 into any of its four positions.

Referring now to FIG. 2, there is shown a form of the invention employing three driving means, namely, solenoids 150, 115, and 116.

It should be noted that in FIG. 2 elements thereof which correspond to elements of FIG. 1 are identified by the same reference characters, although in the hundred series rather than in the ten series. For example, the solenoid 115 in FIG. 2 corresponds to the solenoid 15 of FIG. 1.

In FIG. 2 the winding 151 of solenoid 150 is secured rigidly to some reference frame. Similarly, winding 152 of solenoid 115 is secured to some physical reference point. The solenoid 150, however, drives winding 152 of solenoid 115, so that winding 152 has two discrete positions and its solenoid 115 has four possible discrete positions. It should be noted that solenoid 150 travels a distance Z from its energized to its de-energized state, which distance Z is approximately one-half the distance Y that solenoid 115 will travel from its energized to its de-energized state, as shown in FIG. 1. Thus the solenoid 115 can have four discrete positions, which four discrete positions will cause the right-hand end of bar 110 (also designated by reference characters 210, 210', 210", and 210''' in the dotted line form) to assume any of the four positions defined by the reference characters 124, 224, 124' and 224'. The points 124 and 124' correspond to the points 24 and 24' of FIG. 1, and the points 224 and 224' are two additional points corresponding to the effect of the solenoid 150 in FIG. 2. More specifically, when solenoid 150 is in its energized state, i.e., in its left-hand position, the solenoid 115 will cause the right-hand end of bar 110 to assume either point 124 or 124'. On the other hand, when solenoid 150 is de-energized and in the position shown by the dotted lines of FIG. 2, then the winding 152 of solenoid 115 will move to the right, as shown by the dotted lines in FIG. 2, and solenoid 115 will then cause the right-hand end of bar 110 to assume either positions 224 or 224'.

It is to be understood that the right-hand positions of bar 110 are controlled, not only by the states of the solenoids 150 and 115, but also by the pin 185 in the groove 135, which confines the pin movement within the straight, vertical slot of FIG. 2. The bar 110 can then be seen to have eight different positions by the action of solenoids 150, 115, and 116, with solenoid 116 controlling the left-hand end of bar 110 to locations 123 and 123', as shown in the figure.

Four of the eight positions of bar 110 are designated by reference characters 110, 110', 110", and 110'''. The other positions are designated by reference characters 210, 210", 210', and 210'''. The use of both reference characters 110 and 210 to designate the different positions of the bar is to avoid confusion which might result from too many of the same reference characters appearing in the drawing.

By addition of another solenoid (not shown) to control the position of winding 153 in a manner similar to the arrangement of windings 151 and 152, the number of positions of the pin in slot 135 can be increased to $2^4$ or 16. The limiting factor in the number of discrete positions of the pin in slot 135 is largely a matter of tolerances in constructing the equipment.

Although the slots shown in FIGS. 1 and 2 are straight and positioned vertically in the drawing, it is apparent that other configurations can be employed. Specifically, the slot could be curved in various ways to meet the particular requirements of any given application.

It is to be understood that the forms of the invention shown and described herein are but preferred embodiments thereof and that various changes in the structure can be made, including the addition of more driving means, or the use of other types of driving means, and in the linkage arrangement, without departing from the spirit or the scope of the invention.

I claim:

1. A mechanical movement comprising:
   fixed reference means;
   linkage assembly means comprising first, second, third, fourth, and fifth linkage elements arranged end-to-end in the order recited, and pivotally secured at both extreme ends thereof to points on said fixed reference means;
   first, second, third, and fourth pivotal connecting means connecting, respectively, said first linkage element to said second linkage element, said second linkage element to said third linkage element, said third linkage element to said fourth linkage element, and said fourth linkage element to said fifth linkage element, with the movement of said linkage assembly being confined substantially to a given plane;
   first positioning means for positioning said first pivotal connecting means in N discrete positions;
   second positioning means for positioning said fourth pivotal connecting means in M discrete positions;
   said fixed reference means having a longitudinally shaped slot formed therein and positioned parallel to said given plane and with the normal projection thereof intercepting the positions of said third linkage element at points between the midpoint of said third linkage element and a given end thereof;
   and pin means mounted on said third linkage element and positioned to ride in said slot to confine the movement of said linkage element to a given pattern.

2. A mechanical movement in accordance with claim 1 in which:
   said first and second positioning means each comprise at least one driving means with each driving means being operable to occupy at least two discrete positions and constructed to follow the arcuate paths of said first and fourth pivotal connecting means as said first and fifth linkage elements rotate about the extreme ends of said linkage assembly.

3. A mechanical movement in accordance with claim 1 in which said first and second positioning means each comprise:
   solenoid means positioned, when energized, to move the pivotal connecting means to which it is connected to a first position;
   and spring means tensioned to move said pivotal connecting means to a second position when said solenoid is de-energized.

4. A mechanical movement comprising:
   fixed reference means;
   linkage assembly means comprising first, second, third, fourth, and fifth linkage elements arranged end-to-end in the order recited, and pivotally secured at both extreme ends thereof to points on said fixed reference means;
   a plurality of coupling means pivotally coupling adjacent ends of said linkage elements together;
   first positioning means for positioning a first one of said coupling means, which couples together said first and second linkage means, in N discrete positions, all of which lie substantially in a given plane;
   second positioning means for positioning a second one of said coupling means, which couples together said fourth and fifth linkage means, in M discrete positions, all of which lie substantially in said given plane;
   said fixed reference means having a longitudinally shaped slot formed therein substantially parallel with said given plane and with the normal projection thereof intersecting a given linkage element;
   and pin means secured to said given linkage element and positioned to ride in said slot.

5. A mechanical movement in accordance with claim 4 in which:
   said first and second positioning means each comprising at least one driving means with each driving means being operable to occupy at least two discrete positions and constructed to follow the arcuate paths of said first and second coupling means as said first and fifth linkage elements rotate about the extreme ends of said linkage assembly.

6. A mechanical movement in accordance with claim 4 in which said first and second positioning means each comprises:
   solenoid means positioned, when energized, to move the coupling means to which it is connected to a first position;
   and spring means tensioned to move said coupling means to a second position when said solenoid is de-energized.

References Cited

UNITED STATES PATENTS 3,264,889   8/1966   Machida et al.   74—110
3,334,521   8/1967   Kast   74—110

FRED C. MATTERN, JR., *Primary Examiner.*

F. D. SHOEMAKER, *Assistant Examiner.*